F. L. MOORE.
VEHICLE STORM FRONT.
APPLICATION FILED FEB. 4, 1909.

950,237.

Patented Feb. 22, 1910.

2 SHEETS—SHEET 1.

WITNESSES:
O. M. McLaughlin
W. M. Gentle

INVENTOR.
Frank L. Moore.
BY
V. H. Lockwood
ATTORNEY.

F. L. MOORE.
VEHICLE STORM FRONT.
APPLICATION FILED FEB. 4, 1909.
950,237.
Patented Feb. 22, 1910.
2 SHEETS—SHEET 2.
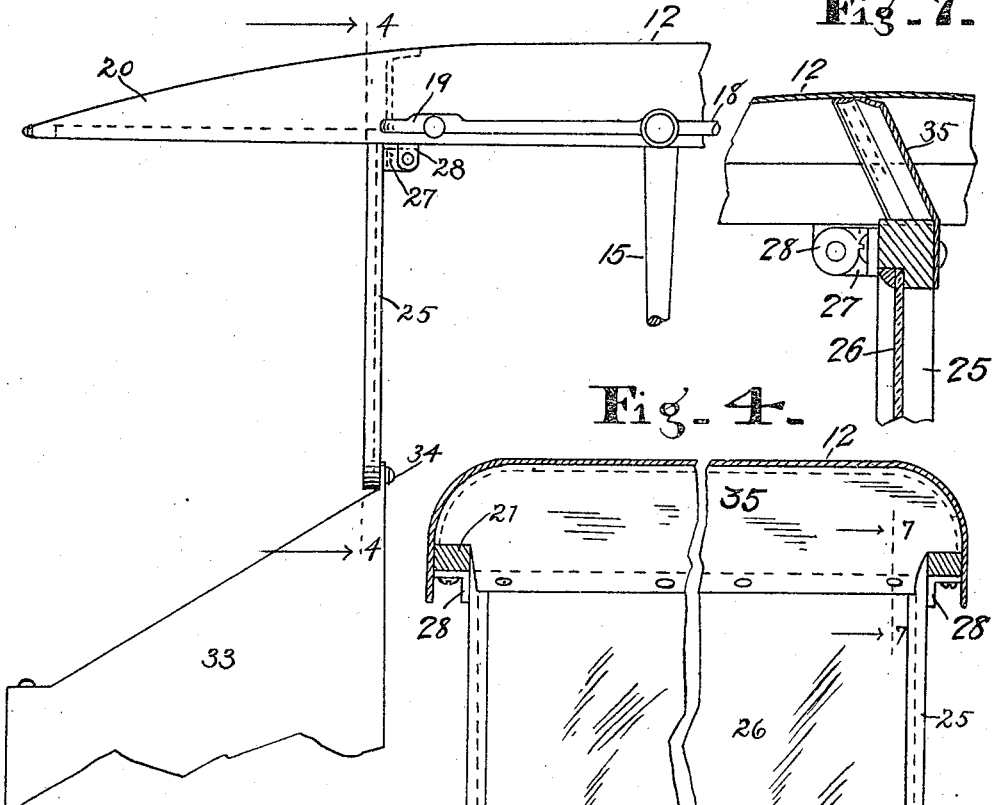
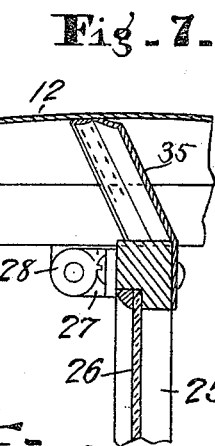
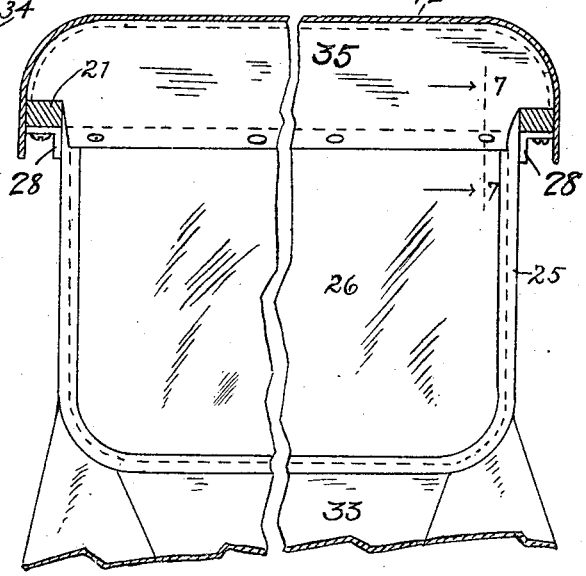
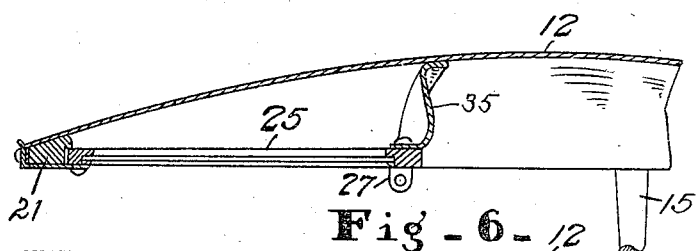
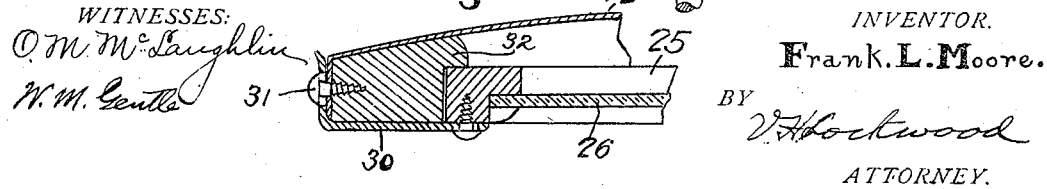
INVENTOR.
Frank. L. Moore.

UNITED STATES PATENT OFFICE.

FRANK L. MOORE, OF INDIANAPOLIS, INDIANA.

VEHICLE STORM-FRONT.

950,237.  Specification of Letters Patent.  Patented Feb. 22, 1910.

Application filed February 4, 1909. Serial No. 475,968.

*To all whom it may concern:*

Be it known that I, FRANK L. MOORE, of Indianapolis, county of Marion, and State of Indiana, have invented a certain new and useful Vehicle Storm-Front; and I do hereby declare that the following is a full, clear, and exact description thereof, reference being had to the accompanying drawings, in which the numerals refer to like parts.

The object of this invention is to improve the storm front construction of tops for automobiles and other vehicles, so as to render the same more effective for keping out the rain and wind, and also more convenient and durable in the construction and the mounting thereof.

One difficulty with the rigid glass storm fronts of automobiles has been in disposing of them or handling them when the top was turned back, where they have usually been attached to the body instead of the top.

Therefore, one feature of the invention consists in securing a rigid, transparent storm front to the top of the vehicle instead of to the body thereof.

Along with the foregoing is the further feature of pivoting such storm front at its upper end to the vehicle top at a point considerably to the rear of the front of the top and preferably so that said rigid storm front can be folded up into the top before and while the top is folded back. I thus provide a very satisfactory manner of disposing of the storm front.

The details of the invention will be understood from the accompanying drawings and the following description and claims.

Figure 1:
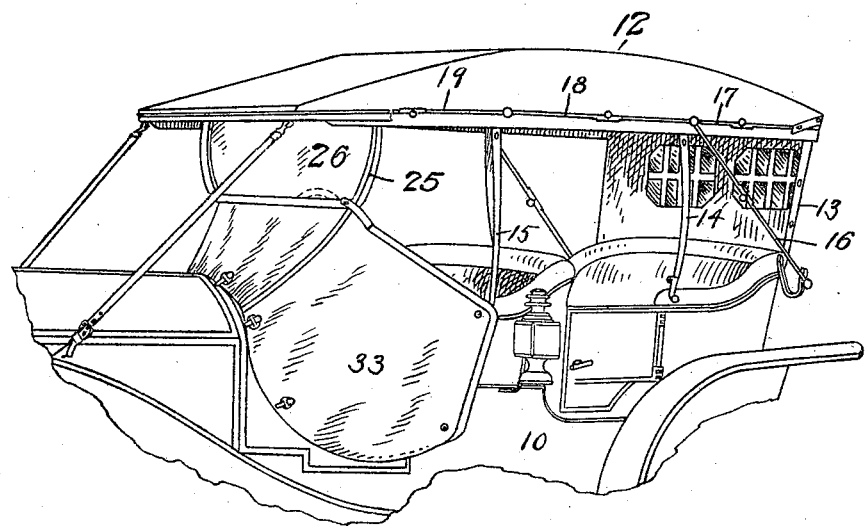
Figure 2:
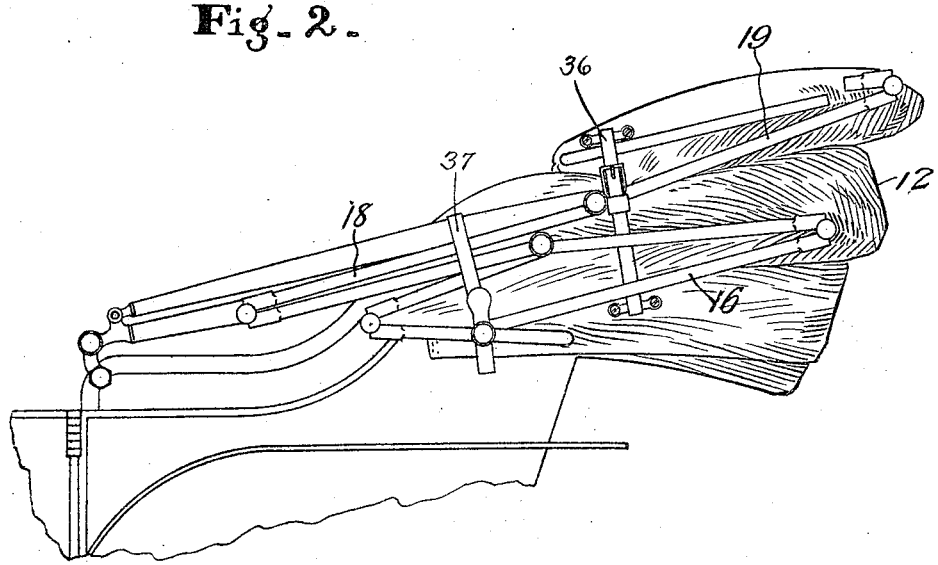

In the drawings Figure 1 is a perspective view of the upper portion of the body of an automobile with the top thereon opened up. Fig. 2 is a side elevation of the rear part of the body of the automobile with the top folded back. Fig. 3 is a side elevation on an enlarged scale of the front portion of the top with the storm front extending downwardly therefrom and the apron connected therewith, parts being broken away. Fig. 4 is a section on the line 4—4 of Fig. 3, the same being centrally broken away vertically. Fig. 5 is a longitudinal section through the front portion of the top with the storm front folded up therein. Fig. 6 is a front portion of Fig. 5 on a larger scale. Fig. 7 is a section on the line 7—7 of Fig. 4 on a larger scale.

The drawings herein show the body 10 of an automobile with a folding top 12 thereon.

13, 14 and 15 are bows of the top, while 16, 17, 18 and 19 are knuckle jointed braces for the top.

There is an extension 20 forming the front end of the top, having a horizontal bow 21, and it is connected with one member of the knuckle jointed braces 19, and extends forwardly therefrom and is covered by a suitable flexible fabric or oilcloth.

The storm front is provided with a rigid frame 25 containing a sheet of glass 26. The frame is U-shaped and at the upper ends on each side an arm 27 is secured that is pivoted to a bracket 28 extending down from the horizontal bow 21. This part of the construction is such that the storm front is suspended and can be turned up forwardly into the forward projection 20 of the top. The projection 20 is long enough to receive the storm front and the latter is held in its folded-up position by a strap 30 that is caught over a button 31 on the front bow of the top, as shown in Fig. 6. The said front bow is recessed at 32 to receive the end of the storm front when elevated.

When the storm front is down, a storm apron 33 of a usual type is detachably secured to the lower end thereof by buttons or the like.

A partition 35 is located in the top above the storm front, it being formed preferably of flexible material. Therefore, the storm front 25, the partition 35 above and the storm apron 33 below completely close the forward part of the automobile. When the storm front 25 is folded up in the position shown in Fig. 5, it will move backwardly with the top when folded as shown in Fig. 2, so it will be entirely out of the way. This is one of the particular advantages of the construction. When folded back the top is held folded down by the straps 36 and 37 shown in Fig. 2.

What I claim as my invention and desire to secure by Letters Patent, is:

1. The combination of a folding vehicle top having a forward portion joined with a portion to the rear thereof so as to fold down against the inner surface of the remaining portion of the vehicle top, a rigid storm front flexibly connected with said top at points near the joints between said portions of the top so that it may be folded forwardly within the forward portion of the top, and means for securing the free end of said storm front to the forward portion of the top, whereby said forward portion of the top and storm front may together be folded back into the remainder of the vehicle top.

2. The combination of a folding vehicle top consisting of a main portion and of a front overhanging extension connected with the main portion so as to fold therewith, a rigid storm front flexibly connected with said vehicle top at points near the rear end of said front extension so that it may be folded forwardly up within said extension of the top, and means for securing the free end of said storm front to the forward portion of said extension of the top, whereby the extension with the storm front secured thereto may be folded back with the remainder of the vehicle top.

In witness whereof, I have hereunto affixed my signature in the presence of the witnesses herein named.

FRANK L. MOORE.

Witnesses:
O. M. McLaughlin,
G. H. Boink.